(12) United States Patent
Lin

(10) Patent No.: US 7,051,730 B2
(45) Date of Patent: May 30, 2006

(54) PORTABLE HEAT EXCHANGING DEVICE

(76) Inventor: Amos Lin, No. 18, 15th Road, Taichung Industrial Park, Taichung (TW)

( * ) Notice: Subject to any disclaimer, the term of this patent is extended or adjusted under 35 U.S.C. 154(b) by 0 days.

(21) Appl. No.: 10/638,325

(22) Filed: Aug. 12, 2003

(65) Prior Publication Data

US 2005/0034717 A1  Feb. 17, 2005

(51) Int. Cl.
*A47G 23/04* (2006.01)
(52) U.S. Cl. .................... 126/246; 62/457.2; 62/457.6; 62/457.7; 62/371
(58) Field of Classification Search ............... 126/246, 126/263.03, 263.04; 62/457.1, 457.2, 457.7, 62/457.6, 371, 530
See application file for complete search history.

(56) References Cited

U.S. PATENT DOCUMENTS

| | | | | |
|---|---|---|---|---|
| 2,771,754 A | * | 11/1956 | Winkler | 220/574.2 |
| 4,019,340 A | * | 4/1977 | Conklin | 62/371 |
| 4,630,641 A | * | 12/1986 | Lacour | 137/505.38 |
| 4,982,722 A | * | 1/1991 | Wyatt | 126/400 |
| 5,307,647 A | * | 5/1994 | McClure | 62/371 |
| 6,164,484 A | * | 12/2000 | Fiore et al. | 220/521 |
| 6,557,370 B1 | * | 5/2003 | Gano, III | 62/457.5 |
| 6,601,403 B1 | * | 8/2003 | Roth et al. | 62/457.2 |
| 6,668,579 B1 | * | 12/2003 | Bigwood et al. | 62/457.6 |
| 6,698,231 B1 | * | 3/2004 | Gano, III | 62/457.9 |
| 6,761,041 B1 | * | 7/2004 | Roth et al. | 62/457.2 |
| 6,769,268 B1 | * | 8/2004 | Gano, III | 62/457.2 |

* cited by examiner

*Primary Examiner*—Ehud Gartenberg
*Assistant Examiner*—James G. Barrow
(74) *Attorney, Agent, or Firm*—Birgh, Stewart, Kolasch & Birch, LLP

(57) ABSTRACT

A heat exchanging device is detachably mounted on a container or a cover. The cover is mounted on the container, thereby forming a closed space between the cover and the container. The heat exchanging device containing a temperature regulating medium is mounted in the closed space between the cover and the container. Thus, the heat exchanging device can be replaced easily and conveniently when being inoperative without having to move the food, thereby facilitating the user using the heat exchanging device, and thereby achieving the sanitary purpose.

9 Claims, 5 Drawing Sheets

PORTABLE HEAT EXCHANGING DEVICE

BACKGROUND OF THE INVENTION

1. Field of the Invention

The present invention relates to a portable heat exchanging device, and more particularly to a portable heat exchanging device that can be replaced easily and has an enhanced heat exchanging efficiency.

2. Description of the Related Art

A conventional heat exchanging device 91 in accordance with the prior art shown in FIG. 5 is mounted in a receiving recess 900 of a dish 90 which is covered by a cover 93. The receiving recess 900 of the dish 90 has a top provided with a baffle 92 to cover the heat exchanging device 91.

However, the heat exchanging device 91 is hidden in the receiving recess 900 of the dish 90 to perform the heat exchanging action with the food located above the baffle 92, thereby decreasing heat exchanging efficiency of the heat exchanging device 91. In addition, the heat exchanging device 91 is hidden in the receiving recess 900 of the dish 90, so that the user needs to remove the cover 93 and the baffle 92 from the dish 90 so as to replace the heat exchanging device 91 when the heat exchanging device 91 is inoperative, thereby causing inconvenience to the user. Further, the heat exchanging device 91 easily touches the food located above the baffle 92, thereby incurring a sanitary problem. Further, it is necessary to form the receiving recess 900 in the dish 90 for receiving the heat exchanging device 91, thereby increasing costs of fabrication.

SUMMARY OF THE INVENTION

The present invention is to mitigate and/or obviate the disadvantage of the conventional heat exchanging device.

The primary objective of the present invention is to provide a heat exchanging device that is received in the receiving portion of the cover to perform the heat exchanging action with the inside of the cover, so that the cover will not touch the food contained in the container, thereby achieving the sanitary purpose.

Another objective of the present invention is to provide a heat exchanging device that can be detached from the cover and the container, so that the heat exchanging device can be replaced easily and conveniently when being inoperative without having to move the food, thereby facilitating the user using the heat exchanging device, and thereby achieving the sanitary purpose.

A further objective of the present invention is to provide a heat exchanging device that is mounted in the closed space formed by the cover and the container to form a closed heat exchanging space, so that the food is entirely received in closed heat exchanging space, thereby enhancing the heat exchanging efficiency of the heat exchanging device.

A further objective of the present invention is to provide a heat exchanging device, wherein the combination portion of the primary body can be directly mounted on the stand portion of the container, so that the heat exchanging device can be used independently, thereby greatly facilitating the user using the heat exchanging device.

In accordance with the present invention, there is provided a heat exchanging device in combination with a container and a cover, wherein:

the cover is mounted on the container, thereby forming a closed space between the cover and the container;

the heat exchanging device is mounted in the closed space between the cover and the container and contains a temperature regulating medium therein.

Further benefits and advantages of the present invention will become apparent after a careful reading of the detailed description with appropriate reference to the accompanying drawings.

DETAILED DESCRIPTION OF THE INVENTION

Figure 1:
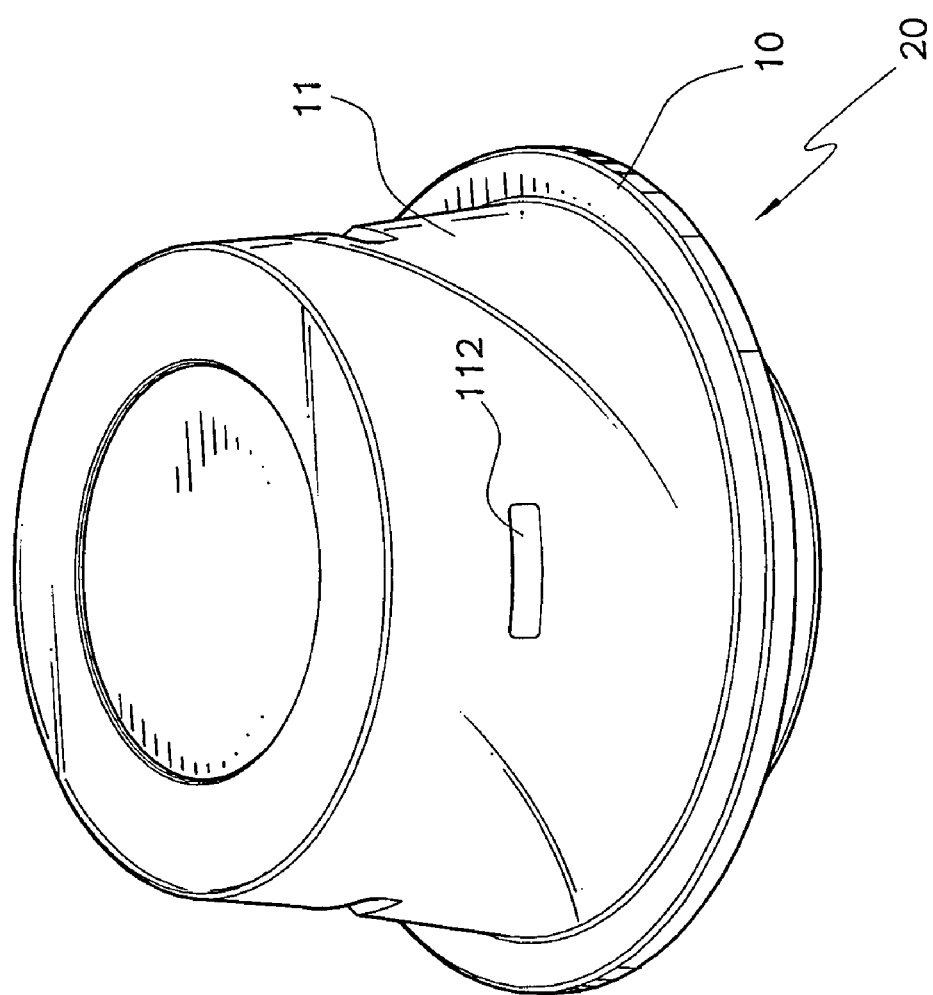
FIG. 1 is a perspective view of a combination of a heat exchanging device, a cover and a container in accordance with the preferred embodiment of the present invention.
Figure 2:
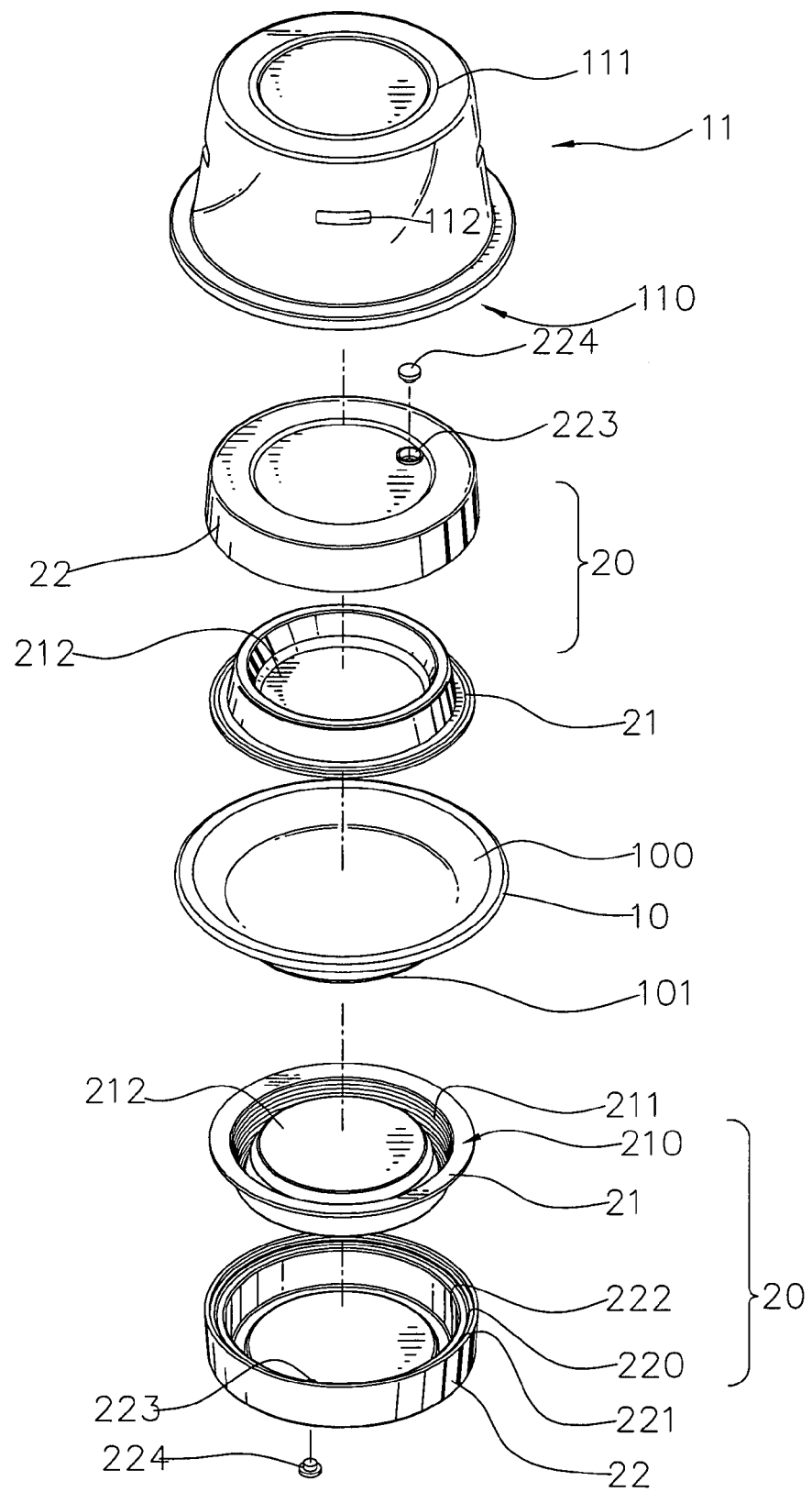
FIG. 2 is an exploded perspective view of the combination as shown in FIG. 1.
Figure 3:
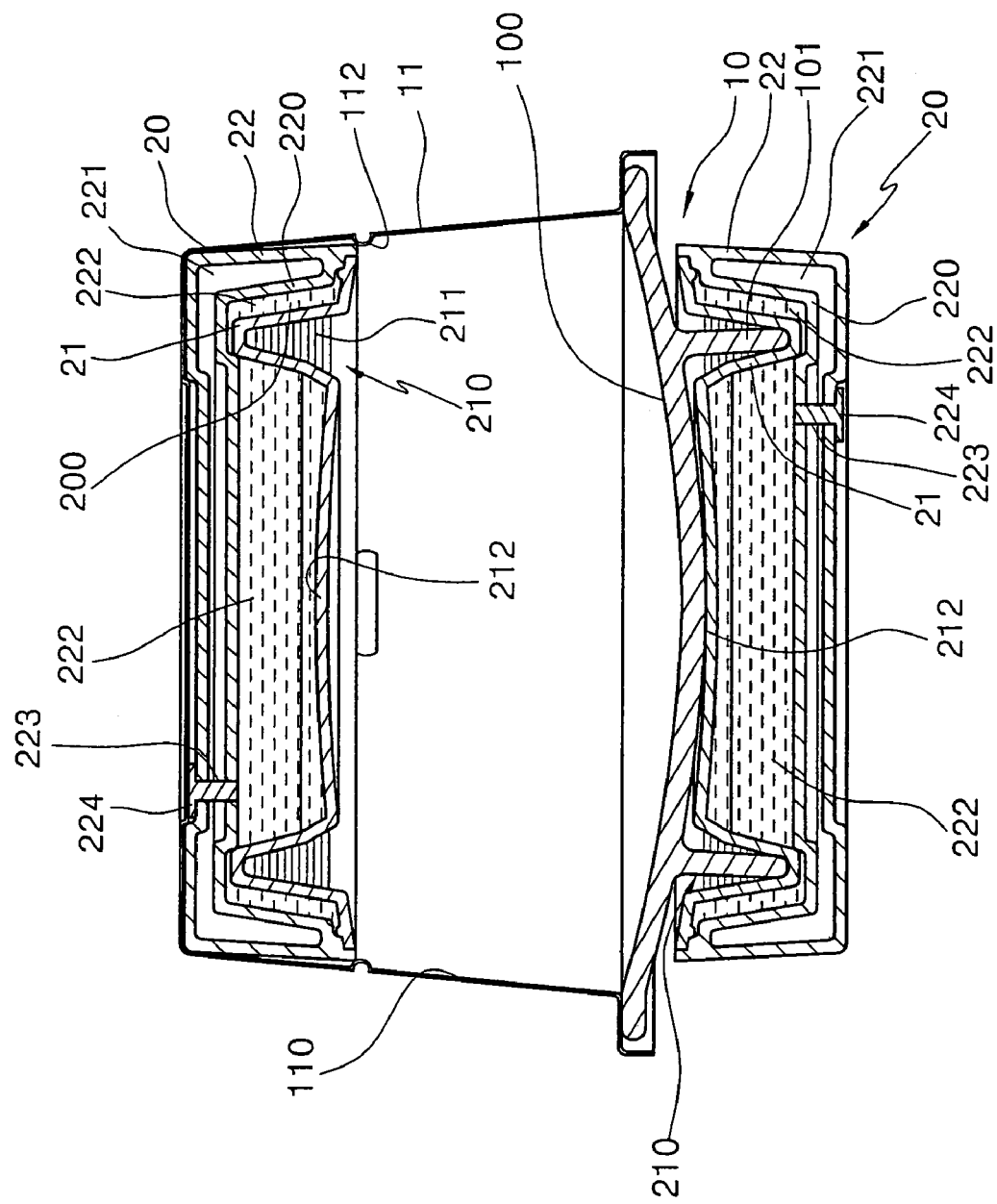
FIG. 3 is a plan cross-sectional view of the combination as shown in FIG. 1.

Referring to the drawings and initially to FIGS. 1–3, a portable heat exchanging device 20 in accordance with the preferred embodiment of the present invention is mounted on a container 10 or a cover 11.

The container 10 contains a food therein and has a top formed with a support portion 100 and a bottom provided with a stand portion 101.

The cover 11 is mounted on the container 10 and has a bottom formed with a receiving portion 110 for receiving the top of the container 10.

The heat exchanging device 20 is detachably mounted on the stand portion 101 of the container 10 or detachably mounted in the receiving portion 110 of the cover 11.

The heat exchanging device 20 comprises a primary body 21 and a secondary body 22 mounted on the primary body 21.

The primary body 21 has a disk shape, and has a periphery formed with a recessed combination portion 210 mounted on the stand portion 101 of the container 10. The combination portion 210 of the primary body 21 has a surface formed with a plurality of anti-skid rims 211. The primary body 21 has a center formed with a protruding planar shaped heat exchanging portion 212 rested on the bottom of the container 10.

The secondary body 22 has a recessed portion mounted on the primary body 21, so that the secondary body 22 is integrally combined with the primary body 21 in a sealing manner. In addition, the secondary body 22 has a tapered outer wall closely forced into the receiving portion 110 of the cover 11, so that the heat exchanging device 20 is fixed in the receiving portion 110 of the cover 11.

The secondary body 22 has an inside provided with a separation wall 220 which divides the secondary body 22 into a heat insulating layer 221 and a filling layer 222. The heat insulating layer 221 of the secondary body 22 is evacuated or filled with heat insulating material. The filling layer 222 of the secondary body 22 is filled with a temperature regulating medium 200 for heating or cooling the food. Preferably, the filling layer 222 of the secondary body 22 is located adjacent to the exchanging portion 212 of the primary body 21.

The secondary body 22 has a bottom formed with an inlet 223 communicating with the heat insulating layer 221 and the filling layer 222 of the secondary body 22 for filling the heat insulating material into the heat insulating layer 221 of the secondary body 22 and filling the temperature regulating medium 200 into the filling layer 222 of the secondary body 22. The secondary body 22 is provided with a sealing cap 224 mounted in the inlet 223.

In practice, the heat exchanging device 20 is mounted on the container 10, with the combination portion 210 of the primary body 21 being mounted on the stand portion 101 of the container 10. The heat exchanging portion 212 of the primary body 21 of the heat exchanging device 20 is rested on the bottom of the container 10, so that the heat exchanging device 20 can perform the heat exchanging action with the container 10.

Similarly, the heat exchanging device 20 is mounted in the receiving portion 110 of the cover 11. The secondary body 22 has a tapered outer wall closely forced into the receiving portion 110 of the cover 11, so that the heat exchanging device 20 is fixed in the receiving portion 110 of the cover 11. The heat exchanging portion 212 of the primary body 21 of the heat exchanging device 20 is received in the receiving portion 110 of the cover 11, so that the heat exchanging device 20 can perform the heat exchanging action with the inside of the cover 11.

In addition, the heat insulating layer 221 of the secondary body 22 can concentrate the heat and prevent the heat from being transferred outward, so as to enhance the heat exchanging efficiency of the heat exchanging device 20.

In addition, the cover 11 has an inner wall formed with an elastic snap portion 112 extended inward therefrom and rested on a bottom of the heat exchanging device 20 in a snapping manner, so that the heat exchanging device 20 is positioned in the receiving portion 110 of the cover 11 rigidly and stably.

Accordingly, the heat exchanging device 20 in accordance with the present invention has the following advantages.

1. The heat exchanging device 20 is received in the receiving portion 110 of the cover 11 to perform the heat exchanging action with the inside of the cover 11, so that the cover 11 will not touch the food contained in the container 10, thereby achieving the sanitary purpose.

2. The heat exchanging device 20 can be detached from the cover 11 and the container 10, so that the heat exchanging device 20 can be replaced easily and conveniently when being inoperative without having to move the food, thereby facilitating the user using the heat exchanging device 20 and thereby achieving the sanitary purpose.

3. The heat exchanging device 20 is mounted in the closed space formed by the cover 11 and the container 10 to form a closed heat exchanging space, so that the food is entirely received in closed heat exchanging space, thereby enhancing the heat exchanging efficiency of the heat exchanging device 20.

4. The combination portion 210 of the primary body 21 is directly mounted on the stand portion 101 of the container 10, so that the heat exchanging device 20 can be used independently, thereby facilitating the user using the heat exchanging device 20.

Figure 4:
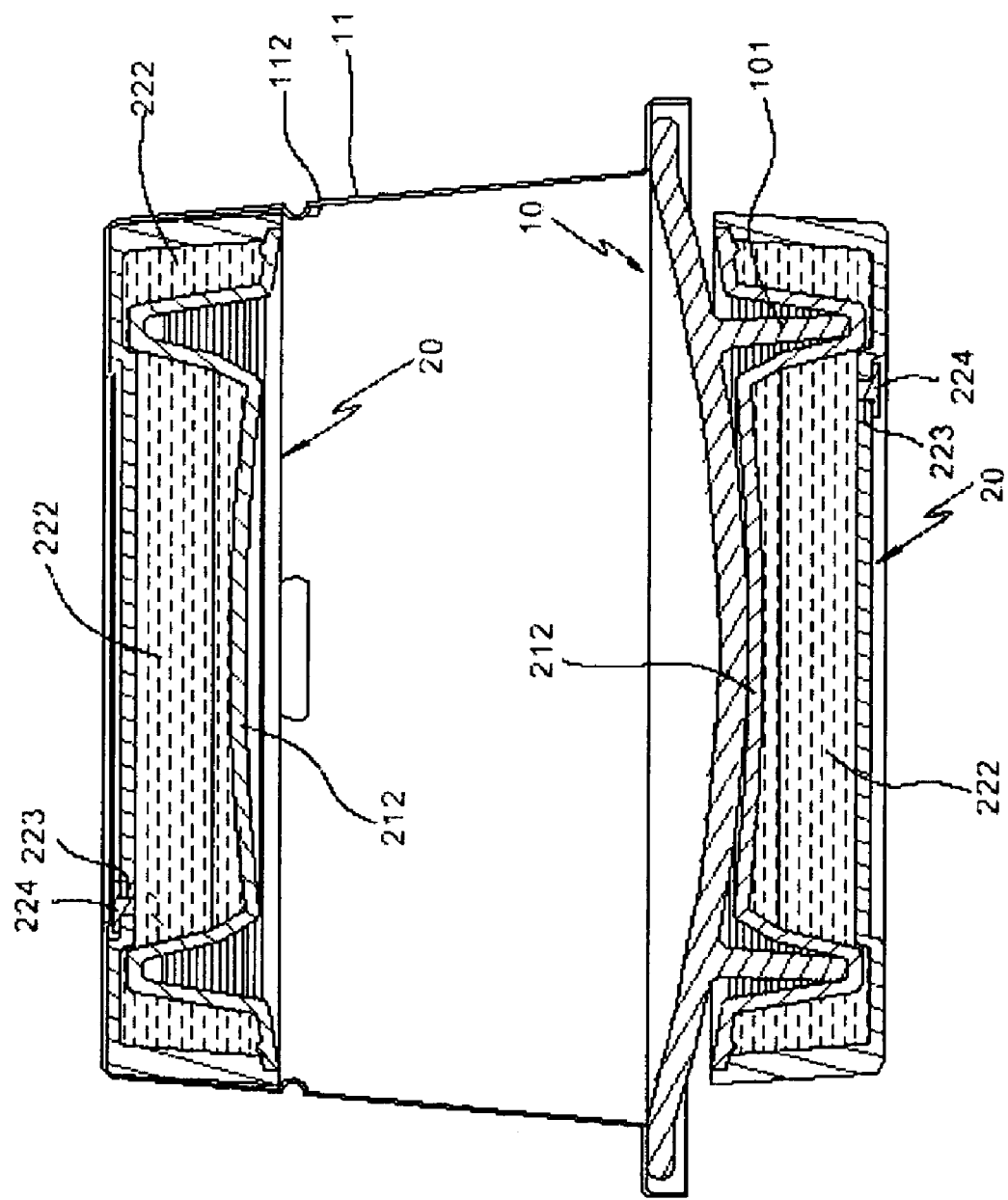
FIG. 4 is a plan cross-sectional assembly view of the combination in accordance with another embodiment of the present invention.
Figure 5:
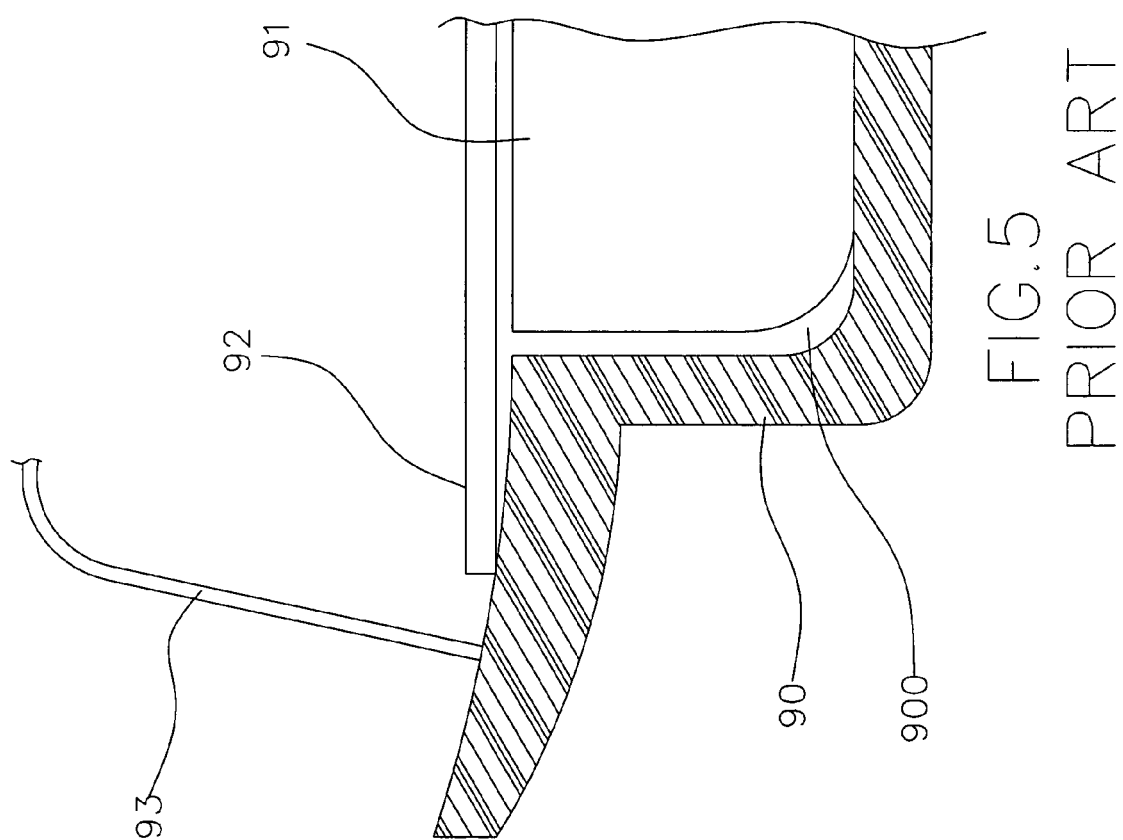
FIG. 5 is a partially cut-away plan cross-sectional assembly view of a conventional heat exchanging device in accordance with the prior art.

Referring to FIG. 4, in accordance with another embodiment of the present invention, the secondary body 22 only has a filling layer 222 located adjacent to the exchanging portion 212 of the primary body 21.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A heat exchanging device in combination with a container and a cover, wherein:
   the cover is mounted on the container, thereby forming a closed space between the cover and the container;
   the heat exchanging device is mounted in the closed space between the cover and the container and contains a temperature regulating medium therein;
   wherein the heat exchanging device comprises a primary body and a secondary body mounted on the primary body, which form a space therebetween into which the temperature regulating medium is placed;
   wherein the secondary body has an inside separation wall which divides a heat insulating layer of the secondary body from the space between the primary body and secondary body into which the temperature regulating medium is placed; and
   wherein the cover has a bottom formed with a receiving portion for receiving the top of the container, and the secondary body has a tapered outer wall closely forced into the receiving portion of the cover, so that the heat exchanging device is fixed in the receiving portion of the cover.

2. The heat exchanging device in accordance with claim 1, wherein the primary body has a disk shape.

3. The heat exchanging device in accordance with claim 1, wherein the secondary body has a recessed portion mounted on the primary body, so that the secondary body is combined into a unit with the primary body.

4. The heat exchanging device in accordance with claim 1, wherein the filling layer is filled with the temperature regulating medium.

5. The heat exchanging device in accordance with claim 1, wherein the primary body has a center formed with a protruding planar shaped heat exchanging portion rested on a bottom of the container, and the filling layer of the secondary body is located adjacent to the exchanging portion of the primary body.

6. The heat exchanging device in accordance with claim 1, wherein the secondary body has a bottom formed with an inlet communicating with the space between the primary and secondary body into which the temperature regulating medium is placed.

7. The heat exchanging device in accordance with claim 6, wherein the second body is provided with a sealing cap mounted in the inlet.

8. A heat exchanging device in combination with a container and a cover, wherein:
- the cover is mounted on the container, thereby forming a closed space between the cover and the container;
- the heat exchanging device is mounted in the closed space between the cover and the container and contains a temperature regulating medium therein;
- wherein the heat exchanging device comprises a primary body and a secondary body mounted on the primary body, which form a space therebetween into which the temperature regulating medium is placed; and
- a second heat exchanging device having a primary body and a secondary body, wherein the primary body of the second heat exchanging device has a center formed with a protruding planar shaped heat exchanging portion rested on a bottom of the container;
- wherein the container has a bottom provided with a stand portion, and the primary body of the second heat exchanging device has a periphery formed with a recessed combination portion mounted on the stand portion of the container.

9. The heat exchanging device in accordance with claim 8, wherein the combination portion of the primary body of both heat exchanging devices has a surface formed with a plurality of anti-skid rims.

* * * * *